(12) United States Patent
Barrenscheen et al.

(10) Patent No.: US 6,891,762 B2
(45) Date of Patent: May 10, 2005

(54) BUFFER MEMORY DEVICE

(75) Inventors: Jens Barrenscheen, München (DE); Dietmar Messner, Vilsbiburg (DE)

(73) Assignee: Infineon Technologies AG, Munich (DE)

( * ) Notice: Subject to any disclaimer, the term of this patent is extended or adjusted under 35 U.S.C. 154(b) by 121 days.

(21) Appl. No.: 10/307,827

(22) Filed: Dec. 2, 2002

(65) Prior Publication Data

US 2003/0137880 A1 Jul. 24, 2003

(30) Foreign Application Priority Data

Nov. 30, 2001 (EP) ............................................. 01128610

(51) Int. Cl.[7] .............................................. G11C 16/04
(52) U.S. Cl. .............................. 365/189.05; 365/189.04
(58) Field of Search ....................... 365/189.05, 189.04, 365/230.08, 189.03

(56) References Cited

U.S. PATENT DOCUMENTS

| | | | |
|---|---|---|---|
| 4,222,102 A | * 9/1980 | Jansen et al. ................. | 710/57 |
| 5,490,113 A | * 2/1996 | Tatosian et al. .......... | 365/189.05 |
| 5,835,418 A | * 11/1998 | Harasawa et al. ........ | 365/189.05 |
| 5,917,782 A | 6/1999 | Kim et al. | |
| 5,917,783 A | 6/1999 | Kobayashi et al. | |
| 6,169,747 B1 | 1/2001 | Sartain et al. | |
| 6,219,295 B1 | * 4/2001 | Toda ...................... | 365/230.03 |

FOREIGN PATENT DOCUMENTS

JP         59 064 941         4/1984

* cited by examiner

*Primary Examiner*—Anh Phung
(74) *Attorney, Agent, or Firm*—Laurence A. Greenberg; Werner H. Stemer; Gregory L. Mayback

(57) ABSTRACT

A buffer memory device buffer-stores data that are to be forwarded. The assembly contains a monitoring device, which monitors the outputting of data requested from the buffer and which ensures, when specific circumstances occur, that the buffer memory device outputs other data instead of the requested data and/or signals that the use of the data output can lead to problems in the system components connected downstream of the buffer memory device. The situation in which data output from the buffer memory device can lead to damage or destruction of a system component which operates using these data can thereby be reliably prevented.

11 Claims, 2 Drawing Sheets

BUFFER MEMORY DEVICE

BACKGROUND OF THE INVENTION

Field Of The Invention

The present invention relates to a buffer memory device, i.e., to a memory device for intermediately storing data to be forwarded.

Such buffer memory devices are required, among many other uses and by way of example, for buffer storing data which are to be output as a continuous data stream but are not provided as a continuous data stream and/or are provided with a different data transmission rate.

As in virtually all technical operations, it is not possible to completely preclude the occurrence of problems in this case.

One of these problems consists in the fact that data to be output from the buffer memory device are not yet stored in the buffer memory device, as a result of which a gap is produced in the data stream to be output.

The presence of a gap in the data stream to be output can have a wide variety of consequences.

If the data are digitally coded audio data which (after D/A conversion thereof) are fed to an amplifier and reproduced via loudspeakers, the presence of a gap in the data stream can lead to a pause, a clicking or to other disturbances in the acoustic signals output by the speakers.

Such disturbances disturb the listener and, and this is much more important, can under certain circumstances lead to the amplifier and/or loudspeakers being damaged or destroyed.

SUMMARY OF THE INVENTION

It is accordingly an object of the invention to provide a buffer memory device, which overcomes the above-mentioned disadvantages of the heretofore-known devices and methods of this general type and which contributes to finding a possibility to prevent data that are output from the buffer memory device from being able to lead to damage or destruction of a device which operates using these data.

With the foregoing and other objects in view there is provided, in accordance with the invention, a buffer memory device, comprising:

an input for receiving data to be forwarded;
an output;
a buffer for buffer-storing data connected between the input and the output;
a monitoring device for monitoring a data output of data requested from the buffer, the monitoring device, on an occurrence of a predefined circumstance, effecting at least one of the following:
  ensuring that the buffer memory device outputs data different from the data requested from the buffer; and
  signaling that a use of the data requested from the buffer and carried by the output can lead to problems in system components receiving the data from the output of the buffer memory device.

In other words, the buffer memory device according to the invention is distinguished by the fact that it contains a monitoring device, which monitors the outputting of data requested from the buffer storage, and which ensures, when specific circumstances occur, that the buffer memory device outputs other data instead of the requested data and/or signals that the use of the data output can lead to problems in the system components connected downstream of the buffer memory device.

In accordance with an added feature of the invention, the monitoring device is configured to check whether the data requested from the buffer are stored therein, and wherein the predefined circumstance includes a circumstance that the data requested from the buffer are not stored in the buffer.

In accordance with an additional feature of the invention, the monitoring device is configured to check whether the data to be output satisfy specific criteria.

In accordance with another feature of the invention, the monitoring device is configured to check whether a difference between respective data words to be output successively from the buffer memory device is greater than a predetermined value, and wherein the predefined circumstance includes a circumstance that the difference between the respective data words to be output successively from the buffer memory device is greater than the predetermined value.

In accordance with again another feature of the invention, the monitoring device is configured to check whether a difference between respective data words to be output successively from the buffer memory device is less than a predetermined value, and wherein the predefined circumstance includes a circumstance that the difference between the respective data words to be output successively from the buffer memory device is less than the predetermined value.

In accordance with a further feature of the invention, the data that are different from the data requested from the buffer and output from the buffer memory device instead of the data requested from the buffer (i.e., replacement data) are the data that were output last from the buffer memory device.

In accordance with again an added feature of the invention, an output terminal of the module that contains the buffer memory is connected to the monitoring device, and the monitoring device is configured to signal that the use of the data requested from the buffer can lead to problems by generating and transmitting a corresponding signal to the output terminal.

In accordance with a preferred embodiment of the invention, the data are audio data and the buffer is configured to buffer-store the audio data.

In accordance with again an additional feature of the invention, the buffer memory device (ZS) is connected upstream of a D/A converter.

In accordance with again a further feature of the invention, the buffer memory device (ZS) forms a part of a CODEC module.

In accordance with a concomitant feature of the invention, the buffer memory device (ZS) forms a part of a program-controlled unit.

The situation in which data output from the buffer memory device can lead to damage or destruction of a system component which operates using these data can thus be reliably prevented with the novel device.

Other features which are considered as characteristic for the invention are set forth in the appended claims.

Although the invention is illustrated and described herein as embodied in a buffer memory device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the follow-

DESCRIPTION OF THE PREFERRED EMBODIMENTS

Figure 1:
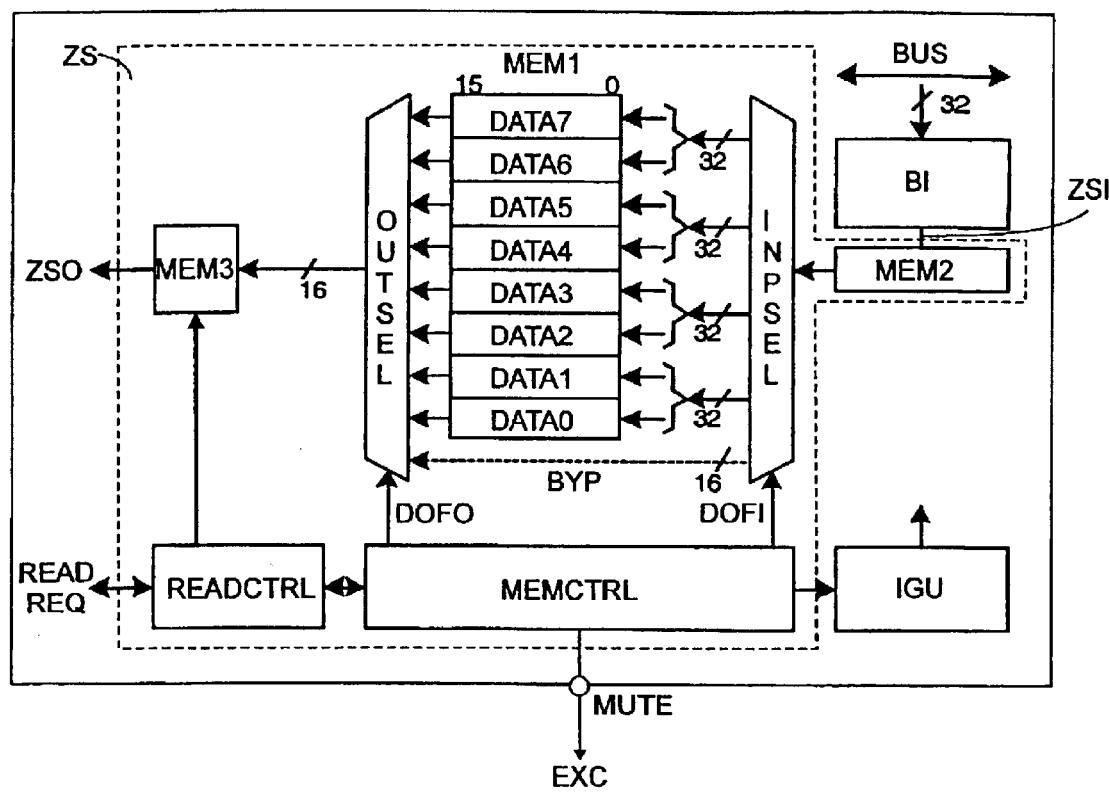
FIG. 1 is a schematic block diagram of a first exemplary embodiment of the buffer memory device according to the invention.

The buffer memory device described below is part of a so-called CODEC module in the exemplary embodiment.

A CODEC module is a device which subjects analog data that are fed to it to an analog/digital conversion and, if appropriate, further processing operations such as, for example, a digital filtering and/or a compression and outputs these data for storage, for instance, on a storage medium; and subjects digital data that are fed to it to a specific processing operation such as, for example, a decompression and/or a digital filtering, then performs a D/A conversion, and outputs the analog data obtained in this case for reproduction e.g. on a stereo system.

In the exemplary embodiment under consideration herein, the buffer memory device is a device that is connected upstream of the D/A converter and ensures that a continuous data stream is fed to the D/A converter, in which case this is generally intended to be ensured even when a continuous data stream is not fed to the buffer memory device, and/or when the data fed to the buffer memory device have a different transmission rate than the data to be output from the buffer memory device.

It shall already be pointed out at this juncture that the buffer memory device described is not restricted to such a use. It could also be provided at a different location within the CODEC module, or be part of a device that does not constitute a CODEC module, or be an autonomous device (a dedicated module).

The data which are buffer-stored by the buffer memory device and forwarded are audio data in the example under consideration. What can be achieved by the provision of the buffer memory device, more precisely by the capability thereof to output the data that are to be forwarded from it as a continuous data stream, is that the information represented by the data, independently of how the relevant data are fed to the buffer memory device, can be reproduced by means of a stereo system connected downstream of the D/A converter, or by means of some other audio data reproduction device, in a manner free from interruptions and disturbances.

The data which are buffer-stored by the buffer memory device and forwarded need not be audio data, however. The use of the buffer memory device described may also prove to be advantageous in cases in which the data that are to be buffer-stored and forwarded are not audio data.

Moreover, the use of the buffer memory device is not restricted to cases in which the data fed to the buffer memory device have to be forwarded in the form of a continuous data stream. The use of the buffer memory device always proves to be advantageous if the timing and/or the order in which the data stored in the buffer memory device are to be forwarded differ from the timing and/or the order in which the relevant data are fed to the buffer memory device.

In the example considered, the CODEC module of which the buffer memory device is part is part of a program-controlled unit such as, for example, a microprocessor, a microcontroller or a signal processor. There is no restriction thereto either. The CODEC module or the device containing the buffer memory device described may also be part of an arbitrary other device.

Referring now to the figures of the drawing in detail and first, particularly, to FIG. 1 thereof, there is shown a program-controlled unit which contains a CODEC module with a buffer memory device. For the sake of completeness, it shall be pointed out that only the components of the program-controlled unit that are of particular interest in the present case, i.e. essentially exclusively the buffer memory device, are shown and described.

The buffer memory device is designated by the reference symbol ZS. It has an input terminal ZSI, via which data are fed to it from a data processing device (not shown in FIG. 1) via an internal bus BUS of the program-controlled unit and a bus interface BI. The buffer memory device ZS further has an output terminal ZSO, via which it outputs data to a D/A converter (not shown in FIG. 1).

The buffer memory device ZS contains a first memory MEM1 for storing a multiplicity of data words, a memory control device MEMCTRL, for controlling the writing of data to the first memory MEM1 and the reading of data from the first memory MEM1, a second memory MEM2 for buffer storing ZS data fed to the buffer memory device and forwarding said data to the first memory MEM1, a third memory MEM3 for buffer storing data output from the first memory MEM1, a read control device READCTRL for controlling the reading of data stored in the buffer memory device ZS, and an interrupt generating device IGU for generating interrupts.

If data are fed to the buffer memory device ZS, they pass via the bus BUS and the bus interface BI into the second memory MEM2, where they are buffer-stored, and from there are accepted into the first memory MEM1 under the control of the memory control device MEMCTRL.

The data which are fed to the buffer memory device ZS via the bus BUS and the bus interface BI are 32-bit data words in the example considered. It goes without saying that the data could also be words comprising more or fewer bits or data transmitted serially in a bitwise fashion.

In the example under consideration, the second memory MEM2 is formed by a register which is 32 bits wide and, consequently, can store one data word.

The first memory MEM1 is formed by a FIFO memory, and, in the example considered, comprises 8 16-bit registers DATA0 to DATA7, an input selection device INPSEL, and an output selection device OUTSEL. The input selection device INPSEL is used to determine the registers of the first memory MEM1 into which the data stored in the second memory MEM2 are respectively accepted. In this case, the 32-bit data word stored in the second memory MEM2 is respectively divided into two 16-bit data words which are then stored in two different registers of the first memory MEM1. In the example considered, the 32-bit data word stored in the second memory MEM2 is written either to the registers DATA0 and DATA1, or to the registers DATA2 and DATA3, or to the registers DATA4 and DATA5, or to the registers DATA6 and DATA7. The registers to which the data stored in the second memory MEM2 are respectively written are determined by the memory control device MEM- CTRL. The latter correspondingly drives the input selection device INPSEL through a control signal DOFI. The input selection device INPSEL is driven in such a way that the registers DATA0 to DATA7 are written to in order in a pairwise manner like a cyclic buffer.

For the sake of completeness, it shall be pointed out that the first memory MEM1 can also contain more or fewer registers and/or larger or smaller registers, and that it is also not absolutely necessary to divide the data that are fed to the first memory MEM1 into two data words and to store them in two different registers.

If data are to be read from the buffer memory device ZS, this is signaled to the buffer memory device ZS by means of a control signal READREQ fed to the read control device READCTRL. The read control device READCTRL forwards the control signal READREQ fed to it immediately or later to the memory control device MEMCTRL, which drives the output selection device OUTSEL by means of a control signal DOFO in such a way that one of the registers DATA0 to DATA7 is read. The control signal DOFO determines which of the registers DATA0 to DATA7 is read. The output selection device OUTSEL is driven in such a way that the registers DATA0 to DATA7 are read in order like a cyclic buffer.

If the data read from the first memory MEM1 are present at the output terminal of the output selection device OUTSEL, the memory control device MEMCTRL signals this to the read control device READCTRL. The read control device READCTRL signal this in turn to the third memory MEM3, which is formed by a register in the example considered and which thereupon accepts the data present at the output terminal of the output selection device OUTSEL. The data stored in the third memory MEM3 can be accepted by the device connected downstream of the buffer memory device ZS, that is to say by the D/A converter (not shown in FIG. 1) in the example considered.

The buffer memory device ZS has the special feature that it contains a monitoring device, which monitors the outputting of data requested from the buffer storage, and which ensures, when specific circumstances occur, that the buffer memory device outputs other data instead of the requested data and/or signals that the use of the data output can lead to problems in the system components connected downstream of the buffer memory device.

In the case of the buffer memory device ZS shown in FIG. 1, the monitoring that is carried out consists in checking whether the data which would have to be output from the buffer memory device ZS during proper operation of the arrangement have actually already been stored in the buffer memory device ZS.

The data which would have to be output from the buffer memory device ZS during proper operation of the arrangement are those data which would have to follow the data output last from the buffer memory device, in order that the information represented by the data is forwarded correctly and completely.

If the data which would have to be output from the buffer memory device ZS during proper operation of the arrangement have not actually been fed to the buffer memory device ZS yet on account of delays in the acquisition, generation and/or communication of the relevant data, the buffer memory device is not able to output the data which it should output during proper operation of the arrangement.

In the example considered, in which the data are audio data to be reproduced by a stereo system or the like, there is a very high probability that this would result in the occurrence of perceptible disturbances, in which case these disturbances may consist in clicking, inter alia, which can damage or destroy the audio amplifier and/or the loudspeakers.

This can be prevented by the monitoring device mentioned above.

In the example considered, the monitoring device is part of the memory control device MEMCTRL.

Each time the memory control device MEMCTRL is requested to effect the outputting of data through the control signal READREQ fed to it, said memory control device checks whether the data whose outputting is requested are already stored in the first memory MEM1.

A number of possibilities exist for the way in which this checking is effected.

The checking can be effected for example using a write pointer which is managed in the memory control device MEMCTRL and which specifies which of the registers DATA0 to DATA7 was written to last, and/or using a read pointer which is likewise managed in the memory control device MEMCTRL and which specifies which of the registers DATA0 to DATA7 is to be read next. The memory control device MEMCTRL knows which register was written to last and which register is to be read next because, after all, said memory control device itself defines the register to which new data are to be written and the register from which data that are to be output are to be read.

Thus, by way of example, the checking as to whether the data requested from the buffer memory device have actually already been stored in the buffer memory device can be effected by checking, upon each request for data from the buffer memory device, whether the read pointer to be used during the read-out has overtaken the write pointer used during the last writing operation. If this is the case, this would mean that, when carrying out the requested read-out operation, data would be read from a register holding no data that have not yet been read out, which is tantamount to stating that it would not be the data which should be output during proper operation of the arrangement that would be output during the read-out of data from the buffer memory device.

Another possibility for checking whether the data requested from the buffer memory device have actually already been stored in the buffer memory device consists in storing and managing an item of information in the memory control device MEMCTRL for each of the registers DATA0 to DATA7, which item of information specifies whether the relevant register has already been read since the last occasion it was written to. Said information item may comprise one bit per register, this bit being set to the value 1, for example, if new data are written to the assigned register, and this bit being set to the value 0 if the assigned register has been read. In this case, before data are read from the buffer memory device, it would be necessary to check whether the bit assigned to the register to be read has the value 0. If this is the case, this would mean that, when carrying out the requested read-out operation, data would be read from a register holding no data that have not yet been read out, which is tantamount to stating that it would not be the data which should be output during proper operation of the arrangement that would be output during the read-out of data from the buffer memory device.

A further possibility for checking whether the data which should be output during proper operation of the configuration would be output during the read-out of data from the buffer memory device consists in reserving, in the registers DATA0 to DATA7, a respective bit which indicates whether the relevant register has already been read since the last occasion it was written to, and in evaluating the content of that bit.

It should be apparent and does not require further explanation that there are also yet further possibilities which can be used to ascertain whether the data which should be output during proper operation of the arrangement would be output during the read-out of data from the buffer memory device.

If the monitoring device or the memory control device MEMCTRL containing the latter ascertains, in the manner described above or in a different manner, that the data requested from the buffer memory device have not yet been stored in the buffer memory device, the buffer memory device assumes a special (exception) state in which it operates differently than otherwise.

The special features of the exception state are that the buffer memory device outputs other data instead of the requested data and/or signals that the use of the data that are output can lead to problems in the system components connected downstream of the buffer memory device.

In the example under consideration here, the data which are output by the buffer memory device ZS instead of the requested data are the data output last. This is realized in the present case by the memory control device MEMCTRL leaving the read pointer unchanged in the exception state, that is to say continuing to permit the outputting of the data that were requested last from the output selection device OUTSEL. As a result, the data fed to the third memory MEM3, and thus also the data that are stored in the third memory and are ready for fetching by the D/A converter, remain the same, and, instead of the requested data, other data are output from the buffer memory device.

Since the data which are output from the buffer memory device instead of the requested data in the exception state are the data output last, the disturbance caused thereby in the acoustic signals reproduced by the loudspeakers is not perceptible, or in any event is not distinctively perceptible. There are neither pauses in the reproduction, nor crackling nor other disturbances which can damage or destroy the amplifier and/or loudspeakers.

Provision could also be made for writing predetermined other data to the third memory MEM3 in exception states, and for outputting these data from the buffer memory device, the data which are suitable for this depending on the use of the data output from the buffer memory device.

In addition or as an alternative, it may be provided that the memory control device MEMCTRL outputs, for the duration of the exception state, a signal which signals that the buffer memory device is in the exception state in which other data (i.e., replacement data) are output instead of the data requested from the buffer memory device.

In the exemplary embodiment, this signal, designated by the reference symbol EXC in FIG. 1, is fed to an output terminal of the program-controlled unit, which output terminal is designated by the reference symbol MUTE.

If this output terminal MUTE is connected to the amplifier which amplifies the D/A-converted buffer memory device output signals, then said amplifier has an item of information about the fact that the analog signals that it is to amplify could be disturbance signals and/or can lead to damage and/or destruction of the amplifier or of the loudspeakers. The amplifier can thus take suitable measures as a precaution which can prevent this. These measures may consist, for example, in the amplifier reducing the gain factor, for the duration of the exception state, to such an extent that damage or destruction of the amplifier and/or of the loudspeakers is precluded. In addition or as an alternative, it might be provided that, for the duration of the exception state, the amplifier filters out or attenuates specific frequency components of the data that it is to amplify.

Preferably, the buffer memory device, more precisely the interrupt generating device IGU, generates an interrupt request signal upon the occurrence of the exception state. That signal causes data to be fed to the buffer memory device again as rapidly as possible.

The buffer memory device remains in the exception state until it is once more able to output the data requested from it, i.e. when the data requested from it are stored in it. The monitoring device contained in the memory control device MEMCTRL can determine when this is the case. For this purpose, it is necessary merely to check whether the conditions which caused the memory control device MEMCTRL to assume the exception state are still present.

It would also be conceivable to leave the exception state as early as when it is ascertained that new data have been written to the second memory MEM2. In this case, in contrast to the usual case, the data to be output from the buffer memory device must not be read from the first memory MEM1, but rather would have to be read from the second memory MEM2 whilst bypassing the first memory MEM1 via the input selection device INPSEL and a bypass line BYP. For the sake of completeness, it should be noted that it is necessary, at the same time, to prevent the data fetched directly from the second memory MEM2 from being written to the first memory MEM1.

A further possibility for checking whether the use of the data to be output from the buffer memory device can lead to problems in the system components connected downstream of the buffer memory device consists in checking whether the size and/or the temporal profile of the data that are output or are to be output satisfy specific conditions.

Figure 2:
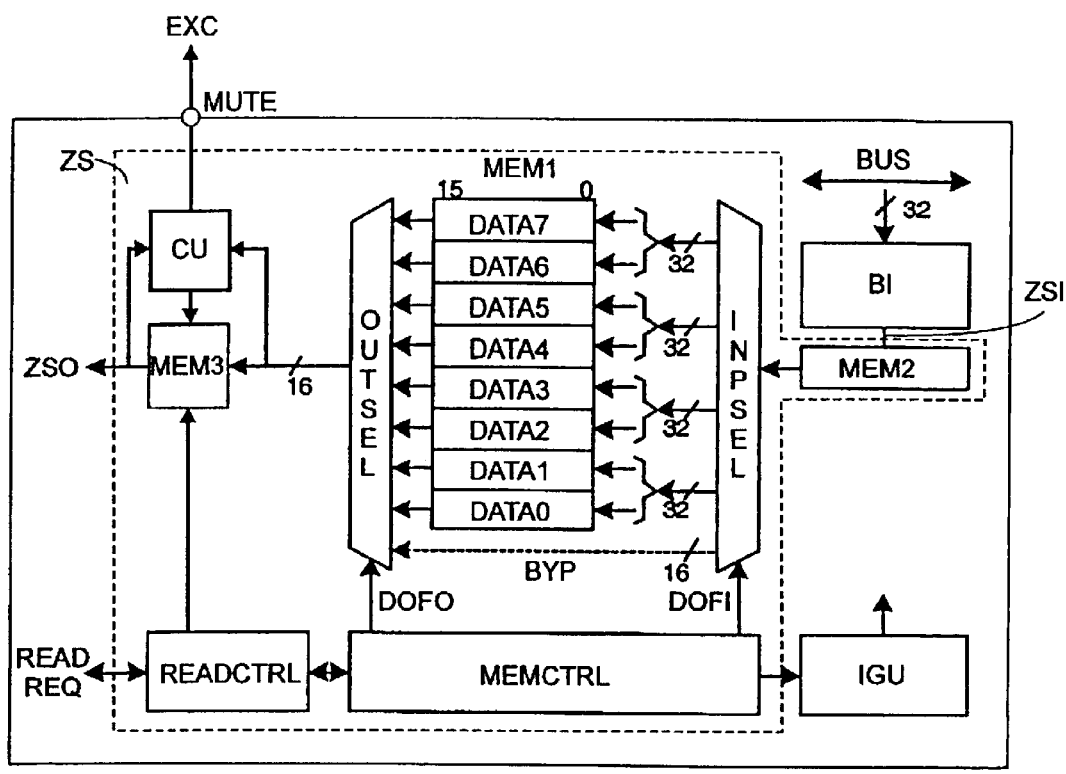
FIG. 2 is a schematic block diagram of a second exemplary embodiment of the buffer memory device according to the invention.

Referring now to FIG. 2, there is shown a program-controlled unit with a buffer memory device which carries out such checking and, when the monitoring device ascertains that the use of the data output can lead to problems in the system components connected downstream of the buffer memory device, outputs other data instead of the requested data and/or signals that the use of the data output can lead to problems in the system components connected downstream of the buffer memory device.

The program-controlled unit shown in FIG. 2 corresponds almost completely to the program-controlled unit shown in FIG. 1. Components designated by the same reference symbols are identical or mutually corresponding components.

The program-controlled unit shown in FIG. 2 differs from the program-controlled unit which is shown in FIG. 1 and has been described with reference thereto in the fact that the memory control device MEMCTRL does not contain a monitoring device which checks whether data requested from the buffer memory device ZS have already been written to the first memory MEM1, and that the buffer memory device ZS contains a monitoring device which is designated by the reference symbol CU and will be described in more detail below.

The monitoring device CU contains two input terminals, of which one is connected to the input terminal of the third memory MEM3 and the other is connected to the output terminal of the third memory MEM3.

Here, the monitoring device CU carries out two checks.

The first check consists in the monitoring device CU checking whether the difference between the data words fed to it via its input terminals exceeds a specific value. The difference between the data words fed to the monitoring device CU via its input terminals is the difference between data words that are to be output successively from the buffer memory device. If said difference is too large, more precisely is larger than it should be on account of the limited bandwidth of the audio signals in the case of undisturbed signals, it can be assumed that the data to be output comprise a disturbance. Consequently, disturbances must be reckoned with during the reproduction of these data by a stereo system or the like, in which case said disturbances may consist in more or less severe clicking which can damage or destroy the amplifier and/or the loudspeakers.

A second check which can be carried out by the monitoring device CU consists in checking whether the difference between two or more data words that are output or are to be output successively falls below a specific value. If the difference is equal to zero or very small for a certain time, it can be assumed that the data to be output contain no useful data or exclusively a DC component. Consequently, disturbances must concomitantly be reckoned with during the reproduction of these data by a stereo system or the like, in which case the amplifier and/or the loudspeakers can be damaged or destroyed at least by a relatively large DC component.

In both cases, i.e. both when the difference determined by the monitoring device CU is too large and when the difference determined by the monitoring device CU is too small, the monitoring device CU initiates measures which prevent or can prevent the data on which the difference formation is based from being able to lead to disturbances in the system components connected downstream of the buffer memory device.

These measures consist in the buffer memory device outputting other data instead of the requested data and/or signaling that the use of the data output can lead to problems in the system components connected downstream of the buffer memory device.

The outputting of other data instead of the requested data by the buffer memory device ZS can be realized for example by the monitoring device CU causing the third memory MEM3 not to accept the data fed to it from the output selection device OUTSEL and, instead, once again to output the data that are stored in it and have already been output beforehand.

Provision could also be made for predetermined other data to be written to the third memory MEM3 instead of the data fed to it from the output selection device OUTSEL. The data which are suitable for this depend on the use of the data output from the buffer memory device.

The signaling by the buffer memory device ZS that the use of the data output can lead to problems in the system components connected downstream of the buffer memory device can be realized, for example, by the monitoring device CU outputting a corresponding signal via the terminal MUTE of the program-controlled unit.

If this output terminal MUTE is connected to the amplifier which amplifies the D/A-converted buffer memory device output signals, then said amplifier has an item of information about the fact that the analog signals that it is to amplify constitute disturbance signals and/or can lead to damage and/or destruction of the amplifier or of the loudspeakers. The amplifier can thus take suitable measures as a precaution which can prevent this. These measures may consist for example in the amplifier temporarily reducing the gain factor to such an extent that damage or destruction of the amplifier and/or of the loudspeakers is precluded. In addition or as an alternative, it might be provided that, for the duration of the exception state, the amplifier filters out or attenuates specific frequency components of the data that it is to amplify.

It should be apparent that the monitoring device CU can also carry out any other checks which can be used to ascertain whether the use of the data that are output or are to be output from the buffer memory device can lead to problems in the system components connected downstream of the buffer memory device. The checks which are suitable for this depend on the information represented by the data and also on the system components connected downstream of the buffer memory device.

It goes without saying that it would also be possible to combine the buffer memory device which is shown in FIG. 1 and has been described with reference thereto and the buffer memory device which is shown in FIG. 2 and has been described with reference thereto. The resultant buffer memory device could carry out all of the checks described above and react to the checking results in the manner described.

We claim:

1. A buffer memory device, comprising:

an input for receiving data;

an output;

a buffer for buffer-storing data connected between said input and said output;

a monitoring device for monitoring a data output of data requested from said buffer, said monitoring device, on an occurrence of a predefined circumstance, effecting at least one of the following:

ensuring that the buffer memory device outputs data different from the data requested from said buffer; and signaling that a use of the data requested from said buffer and carried by said output can lead to problems in system components receiving the data from said output of the buffer memory device.

2. The buffer memory device according to claim 1, wherein said monitoring device is configured to check whether the data requested from said buffer are stored therein, and wherein the predefined circumstance includes a circumstance that the data requested from said buffer are not stored in said buffer.

3. The buffer memory device according to claim 1, wherein said monitoring device is configured to check whether the data to be output satisfy specific criteria.

4. The buffer memory device according to claim 3, wherein said monitoring device is configured to check whether a difference between respective data words to be output successively from the buffer memory device is greater than a predetermined value, and wherein the predefined circumstance includes a circumstance that the difference between the respective data words to be output successively from the buffer memory device is greater than the predetermined value.

5. The buffer memory device according to claim 3, wherein the monitoring device is configured to check whether a difference between respective data words to be output successively from the buffer memory device is less than a predetermined value, and wherein the predefined circumstance includes a circumstance that the difference between the respective data words to be output succeesively from the buffer memory device is less than the predetermined value.

6. The buffer memory device according to claim 1, wherein the data different from the data requested from said buffer and output from the buffer memory device instead of the data requested from said buffer are the data output last from the buffer memory device.

7. The buffer memory device according to claim 1, which further comprises an output terminal connected to said monitoring device, and wherein said monitoring device is configured to signal that the use of the data requested from said buffer can lead to problems by generating and transmitting a corresponding signal to said output terminal.

8. The buffer memory device according to cmlaim 1, wherein the data are audio data and said buffer is configured to buffer-store the audio data.

9. The buffer memory device according to claim 1 in combination with a D/A converter connected to said output of the buffer memory device.

10. The buffer memory device according to claim 1 forming a part of a CODEC module.

11. The buffer memory device according to claim 1 forming part of a program-controled unit.

* * * * *